UNITED STATES PATENT OFFICE.

JAS. M. DAY AND E. H. A. OAKLEY, OF AIKEN, SOUTH CAROLINA.

IMPROVEMENT IN COMPOSITIONS FOR ROOFING.

Specification forming part of Letters Patent No. 24,105, dated May 24, 1859.

*To all whom it may concern:*

Be it known that we, JAMES M. DAY and E. H. A. OAKLEY, of the town of Aiken, in Barnwell district, and State of South Carolina, have invented a new and Improved Composition for Saturating and Treating Canvas for Roofing Purposes; and we do hereby declare that the following is a full and exact description thereof, reference being had to the accompanying specimens.

The nature of our invention consists in a composition of coal-tar, rosin or asphaltum, plaster-of-paris, soda, hydraulic or Roman cement, and lamp-black, combined in such proportions as to form, when applied to canvas, a pliable roofing.

To enable others skilled in such arts to make and use our invention, we will proceed to describe its composition and mode of making the same.

First, dissolve four (4) measures of rosin or asphaltum in seven (7) measures coal-tar in kettle or boiler as large as may be required. Then add, while hot, two measures of plaster-of-paris, four (4) measures of hydraulic or Roman cement, two (2) measures of lamp-black, two (2) measures of soda, the whole to be properly mixed over a fire, and while hot the canvas to be drawn through the said composition and over a quantity of dry hydraulic cement or plaster-of-paris finely pulverized, and at the same time the upper side to be thickly dredged with the same. After the canvas is thus prepared it is to be secured to the roof with small nails or otherwise, (as may best suit the object to be covered,) and a thin coating of the following composition is to be applied with a brush, and to receive smalting of fine sand: six (6) measures of coal-tar, two (2) measures of asphaltum, two (2) measures of lamp-black, two (2) measures of soda, the whole made hot enough to thoroughly mix all of the ingredients and applied while hot.

What we claim as our invention, and desire to secure by Letters Patent, is—

The ingredients in the proportions set forth in the above specification.

JAMES M. DAY.
E. H. A. OAKLEY.

Witnesses:
J. R. JORDAN,
J. A. MERITT.